US012639618B2

(12) United States Patent
Liu

(10) Patent No.: US 12,639,618 B2
(45) Date of Patent: May 26, 2026

(54) METHOD, APPARATUS AND DEVICE FOR GENERATING MODEL AND STORAGE MEDIUM

(71) Applicant: Beijing Baidu Netcom Science and Technology Co., Ltd., Beijing (CN)

(72) Inventor: Haocheng Liu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 1095 days.

(21) Appl. No.: 17/304,686

(22) Filed: Jun. 24, 2021

(65) Prior Publication Data

US 2021/0319366 A1 Oct. 14, 2021

(30) Foreign Application Priority Data

Dec. 22, 2020 (CN) .......................... 202011530270.5

(51) Int. Cl.
*G06N 20/00* (2019.01)
*G06F 7/24* (2006.01)
(Continued)

(52) U.S. Cl.
CPC ............... *G06N 20/00* (2019.01); *G06F 7/24* (2013.01); *G06F 7/32* (2013.01); *G06N 5/01* (2023.01); *G06N 7/01* (2023.01)

(58) Field of Classification Search
CPC .............. G06N 20/00; G06F 7/24; G06F 7/32
See application file for complete search history.

(56) References Cited

U.S. PATENT DOCUMENTS 10,986,408 B1 * 4/2021 Randhawa ............ G06F 16/735
2017/0300546 A1 10/2017 Li et al.
(Continued)

FOREIGN PATENT DOCUMENTS

CA 3 050 951 10/2019
CN 104050556 A 9/2014
(Continued)

OTHER PUBLICATIONS

X. Zhe, G. Chaoyou and Y. Qian, "Real-time Remaining Useful Life Prediction of Core Components of Mechanical and Electrical Equipment Based on Information Fusion," 2020 39th Chinese Control Conference (CCC), Shenyang, China, 2020, pp. 5736-5741, doi: 10.23919/CCC50068.2020.9188740 (Year: 2020).*
(Continued)

*Primary Examiner* — Omar F Fernandez Rivas
*Assistant Examiner* — Corey M Sackalosky
(74) *Attorney, Agent, or Firm* — Knobbe, Martens, Olson & Bear, LLP

(57) ABSTRACT

The present disclosure discloses a method, apparatus and device for generating a model and a storage medium. A method can include: acquiring sample resource features and sample labels; determining a first screening factor according to the sample resource features and the sample labels, and determining first resource features from the sample resource features according to the first screening factor; determining a second screening factor, and determining second resource features from the first resource features based on the second screening factor, and obtaining features of a target model based on the second resource features; and training a machine learning model, by taking the features of the target model as an input of the target model, and taking the sample labels corresponding to the features of the target model as an output of the target model, to obtain the trained target model.

14 Claims, 7 Drawing Sheets

200

(51) Int. Cl.
    *G06F 7/32*           (2006.01)
    *G06N 5/01*           (2023.01)
    *G06N 7/01*           (2023.01)

(56)            References Cited

U.S. PATENT DOCUMENTS

| 2020/0365229 A1* | 11/2020 | Fields | G06F 16/285 |
| 2020/0373012 A1* | 11/2020 | Murakami | G06V 10/40 |
| 2020/0395129 A1* | 12/2020 | Kalkstein | G16H 50/70 |
| 2021/0241320 A1* | 8/2021 | Chaudhari | G06N 20/00 |

FOREIGN PATENT DOCUMENTS

| CN | 109033833 A | 12/2018 | |
| CN | 110175644 A | 8/2019 | |
| CN | 110222097 A | 9/2019 | |
| CN | 110543946 A | 12/2019 | |
| CN | 110782277 A | 2/2020 | |
| CN | 111783843 A | 10/2020 | |
| CN | 112070226 A | 12/2020 | |
| JP | 2020035395 | 3/2020 | |
| JP | 2020060922 | 4/2020 | |
| WO | WO 2017/143919 A1 | 8/2017 | |
| WO | WO-2019200480 A1* | 10/2019 | G06F 18/2193 |
| WO | WO-2020118554 A1* | 6/2020 | G06N 5/01 |

OTHER PUBLICATIONS

Dewancker, I., McCourt, M.J., & Clark, S.C. (2016). Bayesian Optimization for Machine Learning : A Practical Guidebook. ArXiv, abs/1612.04858. (Year: 2016).*

X. Zhe, G. Chaoyou and Y. Qian, "Real-time Remaining Useful Life Prediction of Core Components of Mechanical and Electrical Equipment Based on Information Fusion," 2020 39th Chinese Control Conference (CCC), Shenyang, China, 2020, pp. 5736-5741, doi: 10.23919/CCC50068.2020.9188740 (Year: 2020) (Year: 2020).*

Dewancker, I., McCourt, M.J., & Clark, S.C. (2016). Bayesian Optimization for Machine Learning : A Practical Guidebook. ArXiv, abs/1612.04858. (Year: 2016) (Year: 2016).*

Longzhu, He, "Understand XGBoost deeply Efficient machine learning algorithm and advanced", Machine Industry Press, China Edition Library CIP Data Kernel, 2019.

Tao, Shang, "SAS Data mining and analysis project actual combat", China Railway Publishing House Co., Ltd., China Edition Library CIP Data Kernel, 2020.

Yunming, Xie, "Preoperative diagnostic value of Low-dose CT based Radiomic Analysis for lymph node metastasis in Lung Cancer", Jilin University, Jun. 2020.

Extended European Search Report of Dec. 1, 2021 fore European Patent Application No. 21180612.0. 10 pages.

* cited by examiner

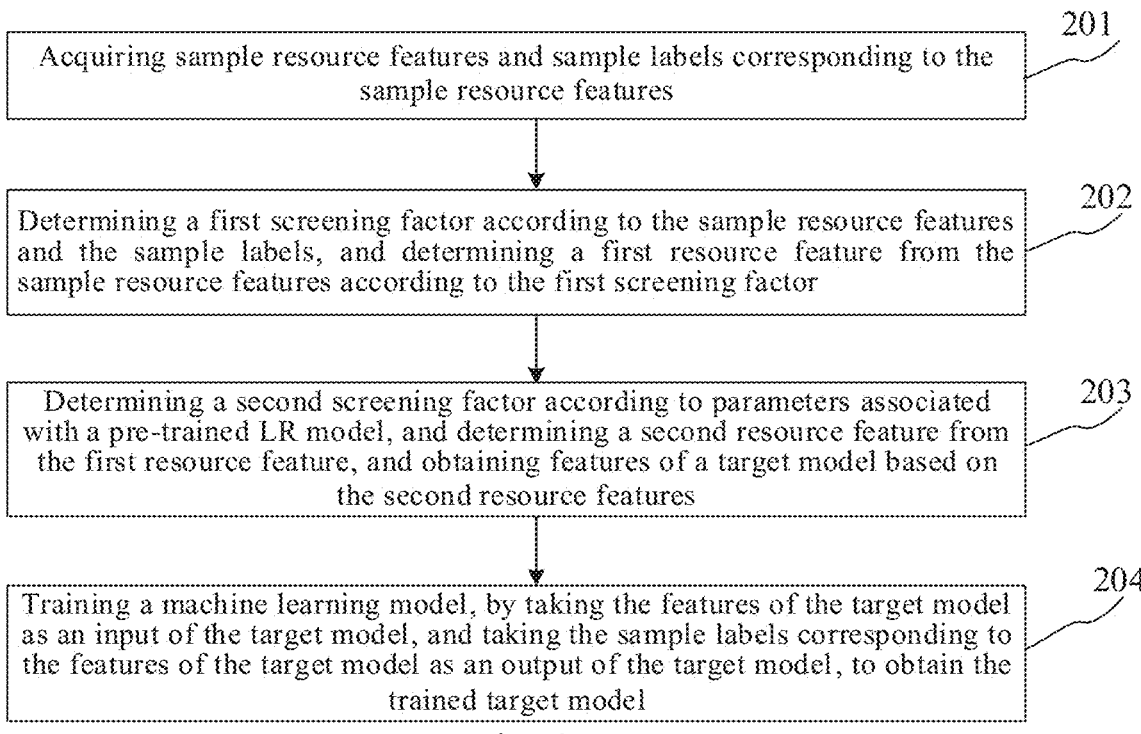

200

201

Acquiring sample resource features and sample labels corresponding to the sample resource features

202

Determining a first screening factor according to the sample resource features and the sample labels, and determining a first resource feature from the sample resource features according to the first screening factor

203

Determining a second screening factor according to parameters associated with a pre-trained LR model, and determining a second resource feature from the first resource feature, and obtaining features of a target model based on the second resource features

204

Training a machine learning model, by taking the features of the target model as an input of the target model, and taking the sample labels corresponding to the features of the target model as an output of the target model, to obtain the trained target model

Fig. 2

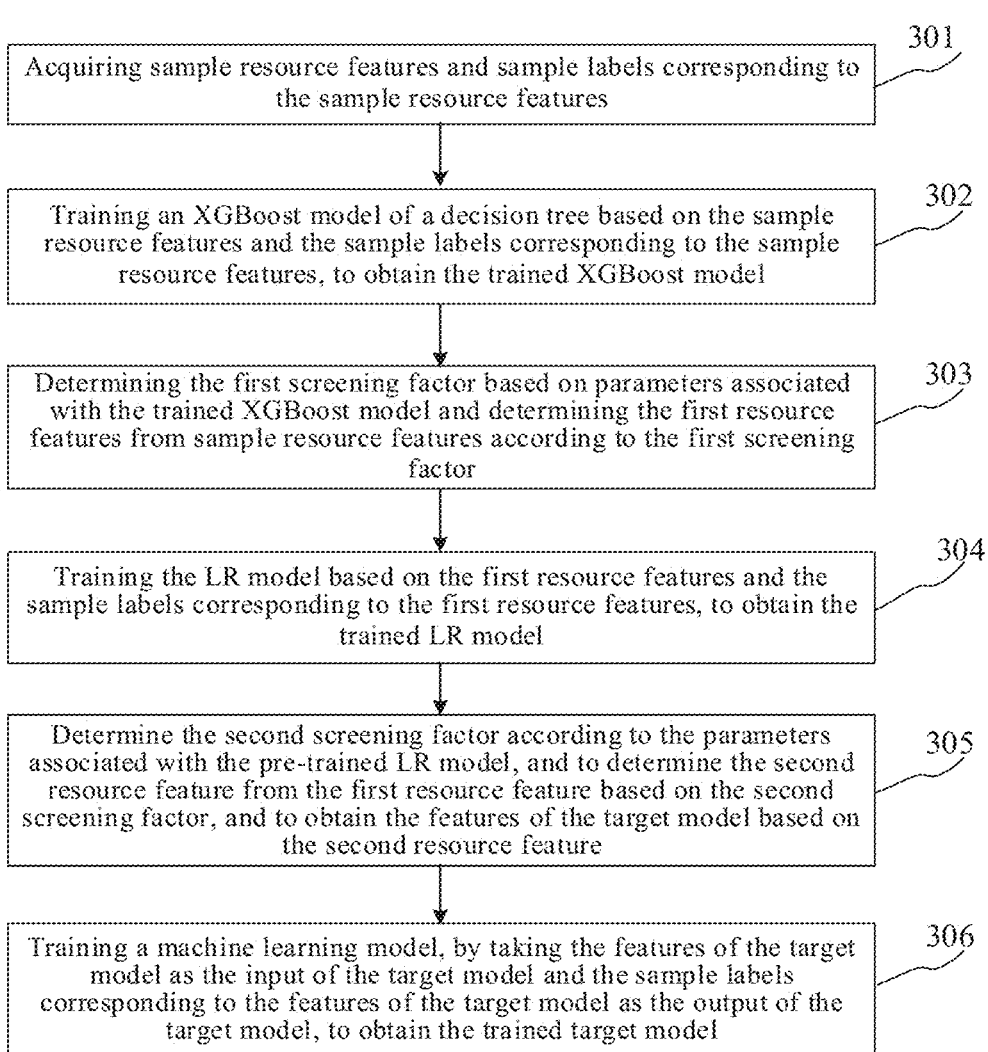

300

Acquiring sample resource features and sample labels corresponding to the sample resource features
301

Training an XGBoost model of a decision tree based on the sample resource features and the sample labels corresponding to the sample resource features, to obtain the trained XGBoost model
302

Determining the first screening factor based on parameters associated with the trained XGBoost model and determining the first resource features from sample resource features according to the first screening factor
303

Training the LR model based on the first resource features and the sample labels corresponding to the first resource features, to obtain the trained LR model
304

Determine the second screening factor according to the parameters associated with the pre-trained LR model, and to determine the second resource feature from the first resource feature based on the second screening factor, and to obtain the features of the target model based on the second resource feature
305

Training a machine learning model, by taking the features of the target model as the input of the target model and the sample labels corresponding to the features of the target model as the output of the target model, to obtain the trained target model
306

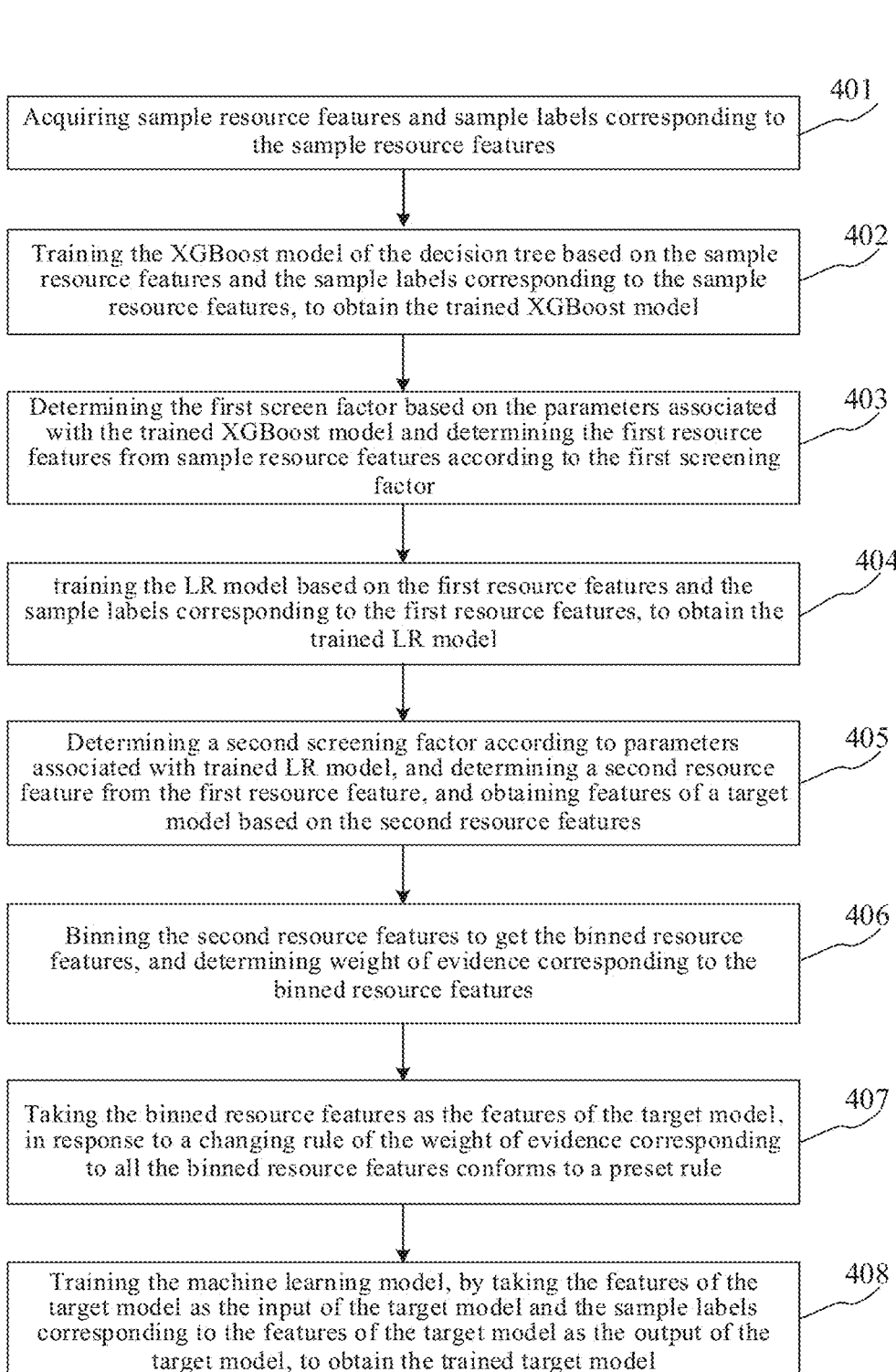

Acquiring sample resource features and sample labels corresponding to the sample resource features                    401

Training the XGBoost model of the decision tree based on the sample resource features and the sample labels corresponding to the sample resource features, to obtain the trained XGBoost model                    402

Determining the first screen factor based on the parameters associated with the trained XGBoost model and determining the first resource features from sample resource features according to the first screening factor                    403 training the LR model based on the first resource features and the sample labels corresponding to the first resource features, to obtain the trained LR model                    404

Determining a second screening factor according to parameters associated with trained LR model, and determining a second resource feature from the first resource feature, and obtaining features of a target model based on the second resource features                    405

Binning the second resource features to get the binned resource features, and determining weight of evidence corresponding to the binned resource features                    406

Taking the binned resource features as the features of the target model, in response to a changing rule of the weight of evidence corresponding to all the binned resource features conforms to a preset rule                    407

Training the machine learning model, by taking the features of the target model as the input of the target model and the sample labels corresponding to the features of the target model as the output of the target model, to obtain the trained target model                    408

Fig. 4

METHOD, APPARATUS AND DEVICE FOR GENERATING MODEL AND STORAGE MEDIUM

CROSS-REFERENCE TO RELATED APPLICATIONS

This application claims priority to Chinese Patent Application No. 202011530270.5, filed with the China National Intellectual Property Administration (CNIPA) on Dec. 22, 2020, the contents of which are incorporated herein by reference in their entirety.

TECHNICAL FIELD

The present disclosure relates to a field of computer technology, particularly to a field of artificial intelligence technology, such as machine learning and big data processing, and more particularly to a method, apparatus, device for generating a model, and relates to a computer readable storage medium.

BACKGROUND

In recent years, as the most basic algorithm of machine learning, Logistic Regression (LR) model plays an important role in a process of generating a target model.

At present, LR operates to screen the features, which are inputted to the target model, based on feature engineering and feature selection, and then train the model based on the inputted features to generate the target model.

SUMMARY

The present disclosure provides a method, apparatus and device for generating a model. The present disclosure also provides a computer readable storage medium storing executable instructions for generating a model.

In a first aspect, an embodiment of the present disclosure provides a method for generating a model, and the method comprises: acquiring sample resource features and sample labels corresponding to the sample resource features; determining a first screening factor according to the sample resource features and the sample labels, and determining first resource features from the sample resource features according to the first screening factor; determining a second screening factor according to parameters associated with a pre-trained LR model, and determining second resource features from the first resource features based on the second screening factor, and obtaining features of a target model based on the second resource features; and training a machine learning model, by taking the features of the target model as an input of the target model, and taking the sample labels corresponding to the features of the target model as an output of the target model, to obtain the trained target model.

In a second aspect, an embodiment of the present disclosure provides an apparatus for generating a model, and the apparatus comprises: a sample acquisition module, configured to acquire sample resource features and sample labels corresponding to the sample resource features; a first determination module, configured to determine a first screening factor according to the sample resource features and the sample labels, and to determine a first resource features from the sample resource features according to the first screening factor; a second determination module, configured to determine a second screening factor according to parameters associated a pre-trained LR model, and to determine a second resource features from the first resource features based on the second screening factor, and to obtain features of a target model based on the second resource features; a model training module, configured to train a machine learning model, by taking the features of the target model as an input of the target model and take the sample labels corresponding to the features of the target model as the output of the target model, to obtain the trained target model.

In a third aspect, an embodiment of the present disclosure provides an electronic device, and the electronic device comprises: at least one processor; and a memory communicatively connected with the at least one processor, where the memory stores instructions executable by the at least one processor, and the instructions, when executed by the at least one processor, cause the at least one processor to execute the method for generating a model as described in any one of the implementations of the first aspect.

In a fourth aspect, an embodiment of the present disclosure provides a non-transitory computer readable storage medium storing computer instructions, where the computer instructions cause a computer to execute the method for generating a model as described in any one of the implementations of the first aspect.

In a fifth aspect, an embodiment of the present disclosure provides a computer program product, comprising a computer program, wherein the computer program, when executed by a processor, implements the method for generating a model as described in any one of the implementations of the first aspect.

The method, apparatus and apparatus for generating the model and storage medium provided in the embodiments of the present disclosure comprise: firstly, acquiring sample resource features and sample labels corresponding to the sample resource features; secondly, determining a first screening factor according to the sample resource features and the sample labels, and determining first resource features from the sample resource features according to the first screening factor; then determining a second screening factor according to parameters associated with a pre-trained LR model, and determining second resource features from the first resource features based on the second screening factor, and obtaining features of a target model based on the second resource features; and finally training a machine learning model, by taking the features of the target model as an input of the target model, and taking the sample labels corresponding to the features of the target model as an output of the target model, to obtain the trained target model. This avoids the need to rely on a large number of feature engineering, feature screening and model interpretability when determining features to be inputted into the target model based on the LR model, thereby reducing time and manpower consumption.

It shall be understood that the description in this section does not intend to identify key or critical features of the embodiments of the disclosure, nor does it intend to limit the scope of the disclosure. Other features of the present disclosure will become readily apparent from the following description.

BRIEF DESCRIPTION OF THE DRAWINGS

The other features, purposes and advantages of this disclosure will become more apparent by a detailed description of the non-restrictive embodiment with reference to the drawings below. The drawings intend to provide a better understanding of the present disclosure and are not construed as limiting the disclosure. Wherein:

3

Figure 1:
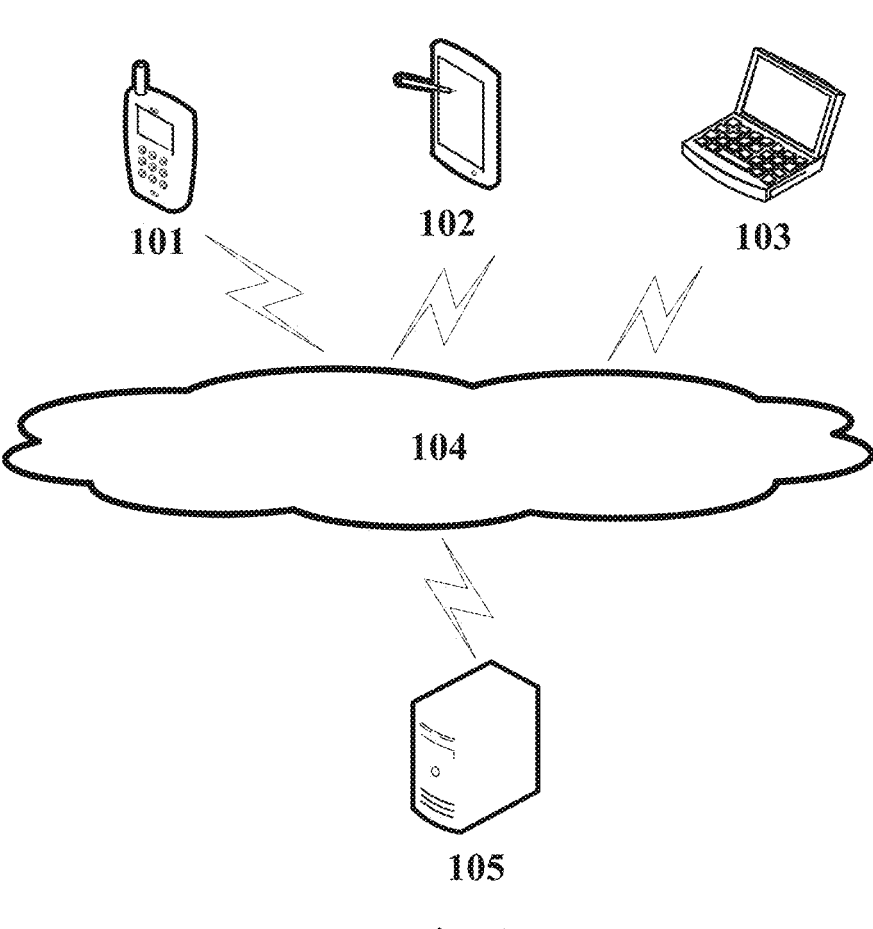
Figure 5:
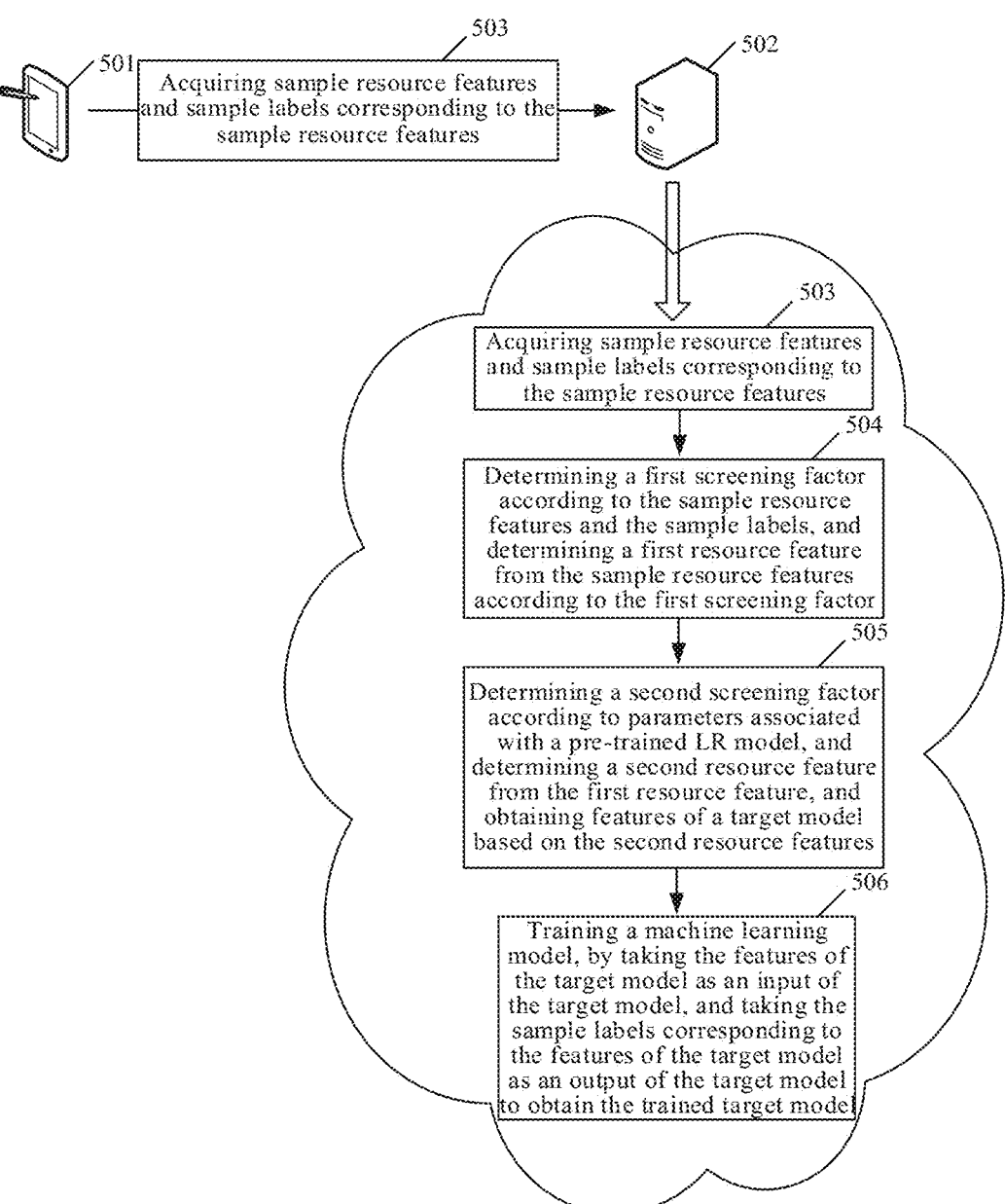
Figure 6:
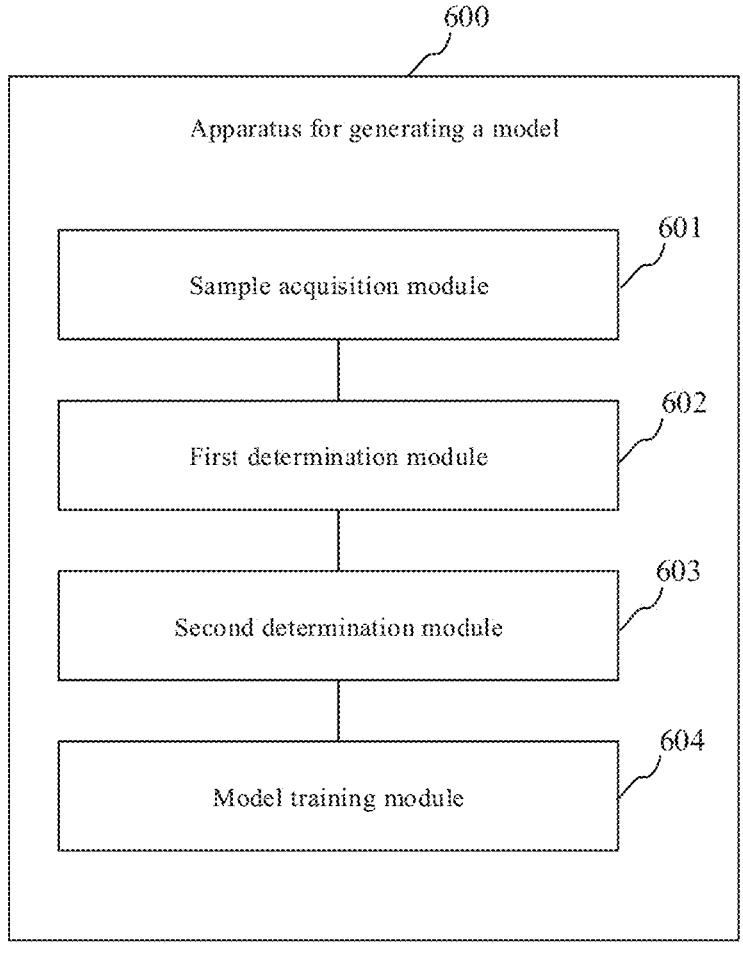
Figure 7:
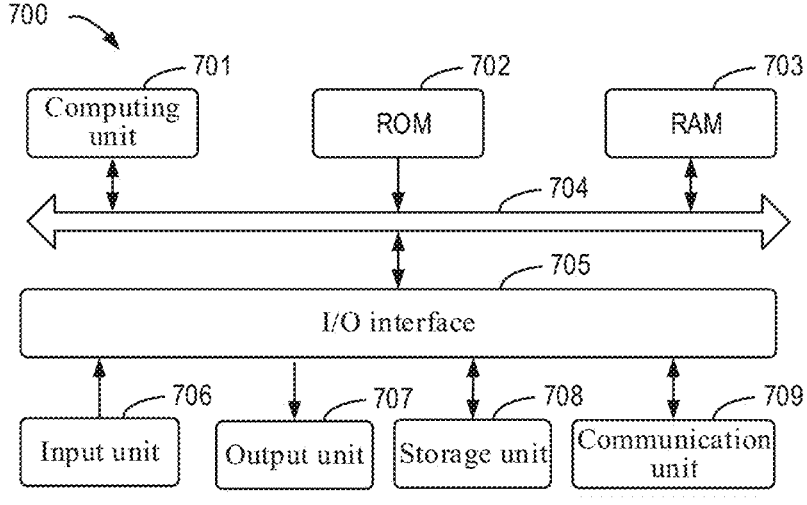

FIG. 1 is an example system architecture in which an embodiment of the present disclosure may be applied;

FIG. 2 is a flow chart of a method for generating a model according to an embodiment of the present disclosure;

FIG. 3 is a flow chart of a method for generating a model according to another embodiment of the present disclosure;

FIG. 4 is a flow chart of a method for generating a model according to a further embodiment of the present disclosure;

FIG. 5 is a scenario diagram of a method for generating a model according to an embodiment of the present disclosure;

FIG. 6 is a structural schematic diagram of an apparatus for generating a model according to an embodiment of the present disclosure;

FIG. 7 is a block diagram of an electronic device used to implement the method for generating a model according to an embodiment of the present disclosure.

DETAILED DESCRIPTION OF EMBODIMENTS

Embodiments of the present disclosure are described below in connection with the accompanying drawings, in which various details of the condiments of the present disclosure are comprised to facilitate understanding, and are to be considered as examples only. Accordingly, ordinary skilled in the art shall recognize that various changes and modifications may be made to the embodiments described herein without departing from the scope and spirit of the present disclosure. Also, for clarity and conciseness, descriptions of well-known functions and structures are omitted from the following description.

It should be noted that the embodiments in this disclosure and the features in the embodiments may be combined with each other without conflict. This disclosure is described in detail below with reference to drawings and embodiments.

FIG. 1 illustrates an example system architecture 100 in which a method or an apparatus for generating a model according to an embodiment of the present disclosure may be applied.

As illustrated in FIG. 1, the system architecture 100 may comprise terminal devices 101, 102, 103, a network 104 and a server 105. The network 104 serves as a medium for providing a communication link among the terminal devices 101, 102, 103 and the server 105. The network 104 may comprise various types of connections, such as wired, wireless communication links, or fiber optic cables.

A user may interact with the server 105 through the network 104 by using the terminal devices 101, 102 103 to receive or send information, etc. Various applications may be installed on the terminal devices 101, 102 and 103, such as various client applications, multi-party interactive applications, and artificial intelligence applications.

The terminal devices 101, 102 and 103 may be hardware or software. Where the terminal devices 101, 102 and 103 are hardware, they may be various electronic devices with display screens, comprising but not limited to an smart phones, tablet computers, laptop portable computers and desktop computers, and the like. Where the terminal devices 101, 102 and 103 are software, they may be installed in the electronic devices listed above. It may be implemented, for example, as a plurality of software or software modules, or it may be implemented as a single software or software module. It is not specifically limited herein.

The server 105 may be a server that provides various services, for example, a back-end server that provides support for the terminal devices 101, 102, and 103. The background server may analyze and process the received request and other data, and feed back the processing result to the terminal device.

It should be noted that the server may be hardware or software. Where the server is hardware, it may be implemented as a distributed server cluster composed of multiple servers, or as a single server. Where the server is software, it may be implemented as multiple software or software modules for providing distributed services, or as a single software or software module. No specific restrictions here.

In practice, the method for training the label generation model or the method for determining a service label provided according to the embodiments of the present disclosure may be executed by the terminal device 101, 102, 103 or the server 105, and the device for training the label generation model or the apparatus for determining the service label may also be set in terminal device 101, 102, 103 or server 105.

It shall be understood that the terminal devices, networks and the number of servers in FIG. 1 are merely illustrative. There may be any number of terminal devices, networks, and servers as desired for implementation.

Continuing to refer to FIG. 2, there is shown a flow of the method 200 for generating a model according to an embodiment of the present disclosure. The method for generating a model comprises the following steps.

Step 201: acquiring sample resource features and sample labels corresponding to the sample resource features.

In this embodiment, the execution entity of the method of generating a model (for example, the server 105 shown in FIG. 1) may obtain a plurality of sample resource features and sample labels corresponding to the sample resource features from a local or terminal device (for example, the terminal device 101, 102, 103 shown in FIG. 1), and each sample resource feature corresponds to a sample label. The above-mentioned sample resource features may be resource-related features. For example: resource exchange frequency features, transaction resource features; resource utilization rate (number of times a given resource has been used/total number of times a given resource has been received); payment features extracted by payment information, such as payment amount features, payment frequency, etc.; features of user's preference resources, features of user's operation resources (click, follow, purchase, etc.), features of user information (age, gender, etc.).

The above-mentioned sample labels may be obtained by using manual labeling labels, regular labeling labels, and clustering labeling labels. Wherein, the rule of labeling is to obtain the training set by setting some screen conditions (rules) and labeling part of the data. The cluster labeling label is to obtain different categories of labels through the method of clustering after feature engineering.

It should be noted that this embodiment may be applied to a "binary classification" application scenario. For example, in the scenario of lending, it may be analyzed based on the user's income, deposits, occupation, age and other factors to determine whether to borrow; in the scenario of emailing, it may, based on the content of the email, to determine whether the email is spam. In the scenario of recommending products or advertisements, it may recommend products or advertisements to users based on user's preferences for products or advertisements, user's operations on products or advertisements, user's information, etc.

Step 202: determining a first screening factor according to the sample resource features and the sample labels, and determining first resource features from the sample resource features according to the first screening factor.

In this embodiment, the above-mentioned execution entity may match the corresponding screening factor according to the sample resource features and/or sample label; or train the model according to the sample resource features and sample label, and use the associated parameters involved in the model to determine the first screening factor. The above-mentioned first screening factor may be used to screen the first resource features from a plurality of sample resource features.

Before matching the corresponding screening factors based on the sample resource features and/or sample labels, the method of generating the model may further comprise: presetting the screening factors that correspond to the sample resource features and/or sample labels.

In this embodiment, the execution entity may screen out the first resource features from a plurality of sample resource features according to the first screening factor; or the above-mentioned execution entity may sort the plurality of sample resource features, and then screen out the first resource features from the preset number of sample resource features among the sorted multiple sample resource features.

Step 203: determining a second screening factor according to parameters associated with a pre-trained LR model, and determining second resource features from the first resource feature based on the second screening factor, and obtaining features of a target model based on the second resource features.

In this embodiment, the execution entity may determine a second screening factor according to parameters associated with a pre-trained LR model, and determine second resource features from the first resource feature based on the second screening factor, and obtain features of a target model based on the second resource features. The above-mentioned parameters associated with the pre-trained LR model may be the parameters involved in the process of pre-training the LR model, such as variable coefficient, information value, population stability index, and variance expansion coefficient.

In this embodiment, the execution entity may screen out second resource features from the first resource features according to the second screening factor. The second screening factor may be used to screen the second resource features from the first resource feature.

In this embodiment, the execution entity may take the second resource features as the feature of the target model, or the execution entity process the second resource features to get the resource features after processing. Then, the processed resource features are taken as the features of the target model. For example, the second resource features are binned to get the features after being binned.

Step 204: training a machine learning model, by taking the features of the target model as an input of the target model, and taking the sample labels corresponding to the features of the target model as an output of the target model, to obtain the trained target model.

In this embodiment, after obtaining the features of the target model and the sample labels corresponding to the features of the target model, the execution entity may train the machine learning model by using the features of the target model and the sample labels corresponding to the features of the target model to train a machine learning model and obtain the trained target model. During the training, the execution entity may use the features of the target model as the input of the target model, and use the sample labels, which correspond to the inputted features of the target model, as the desired output of the target model. The above-mentioned machine learning model may be a probability model, a classification model or other classifiers in the existing technology or future development technology. For example, the machine learning model may comprise any of the following: decision tree model (XGBoost), logistic regression model (LR), deep neural network model (DNN), gradient boosting decision tree model (Gradient Boosting Decision Tree, GBDT).

The method for generating a model provided according to the embodiment of the disclosure comprises: firstly, acquiring sample resource features and sample labels corresponding to the sample resource features; secondly, determining a first screening factor according to the sample resource features and the sample labels, and determining first resource features from the sample resource features according to the first screening factor; then determining a second screening factor according to parameters associated with a pre-trained LR model, and determining second resource features from the first resource features based on the second screening factor, and obtaining features of a target model based on the second resource features; and finally training a machine learning model, by taking the features of the target model as an input of the target model, and taking the sample labels corresponding to the features of the target model as an output of the target model, to obtain the trained target model. This avoids the need to rely on a large number of feature engineering, feature screening and model interpretability when determining features to be inputted into the target model based on the LR model, thereby reducing time and manpower consumption.

In some alternative implementations of the present embodiment, determining a first screening factor according to the sample resource features and the sample labels comprises: training an eXtreme Gradient Boosting (XGBoost) model of a decision tree based on the sample resource features and the sample labels corresponding to the sample resource features, to obtain the trained XGBoost model; and determining the first screening factor based on parameters associated with the trained XGBoost model.

In this embodiment, the execution entity may determine the first screening factor according to parameters associated with the trained XGBoost model. The parameters associated with the trained XGBoost model comprise: a coverage and a correlation coefficient.

In this embodiment, after obtaining the sample resource features and the sample label corresponding to the sample resource feature, the above-mentioned execution entity may train the XGBoost model by using the sample resource features and the sample label corresponding to the sample resource features to obtain the trained XGBoost model. During the training, the executive entity may take the sample resource features as the input of the XGBoost model, and take the sample labels, which correspond to the inputted sample resource feature, as the desired output to obtain the trained XGBoost model.

In this embodiment, based on the parameters involved in training the XGBoost model with the sample resource features and the sample labels, the determination of the first screening factor is realized.

In some alternative implementations of the present embodiment, the parameters associated with the trained XGBoost model comprise: a coverage and a correlation coefficient; and determining a first screening factor according to the sample resource features and the sample labels comprises: determining the first screening factor according to the coverage and/or the correlation coefficient.

In this embodiment, the execution entity may determine the first screening factor according to the coverage and/or the correlation coefficient, or determine the first screening factor according to the coverage; or determine the first screening factor according to the correlation coefficient. The above coverage=("number of samples"-"number of the samples with missed features")/"number of samples", where "the number of samples" may be the number of all samples involved in the process of training the XGBoost model, and "the number of samples with missed features" may be the number of samples, which have missed features in all samples. The above correlation may be the correlation coefficient between the sample resource features and the corresponding sample label.

It should be noted that, where the first screening factor is determined according to the coverage and the correlation coefficient, the user may also set the weight of the coverage and the correlation coefficient according to the feature screening requirements, and then perform a weighted sum to obtain the first screening factor.

In this embodiment, through coverage and/or correlation coefficient (cor), the determination of the first screening factor is achieved.

In some alternative implementations of the present embodiment, the method for generating a model comprises: sorting the sample resource features to get the sorted sample resource features; the determining first resource features from the sample resource features comprises: determining the first resource features from a preset number of sample resource features in the sorted sample resource features according to the first screening factor.

In this embodiment, the above-mentioned execution entity may also sort the plurality of sample resource features, for example, the importance of the features, before determining the first resource features from the features of the plurality of sample resources; then, screen out the first resource features from the preset number of sample resource features among the sorted sample resource features. The first resource features may be a part of the sample resource features selected based on the first screening factor among the sample resource features. The preset number of sample resource features may be set according to the performance of the target model or set by the user. For example, the sample resource features ranked in the top 10.

In this embodiment, the above-mentioned execution entity may determine the first resource features from a preset number of sample resource features in the sorted sample resource features according to the first screening factor.

In some alternative implementations of the present embodiment, sorting the sample resource features to get the sorted sample resource features comprises: sorting, according to the feature importance of the sample resource features, the sample resource features to obtain the sorted sample resource features.

In this embodiment, it may first calculate the feature importance of each sample resource feature among the plurality of sample resource features, and then sort the plurality of sample resource features according to the feature importance of each sample resource feature. The above feature importance may be calculated by "weight"*"gain".

In a specific embodiment, according to weight*gain>10, coverage>5%, cor<0.7, the first resource features are selected from multiple sample resource features.

In this embodiment, according to the feature importance of the sample resource features, the sorting of the sample resource features is realized, and the preset number of the sample resource features in the sorted sample resource features are used as the candidate features of the first resource feature.

In some alternative implementations of the present embodiment, prior to determining the second screening factor based on the parameters associated with the pre-trained LR model, the method further comprises: training the LR model based on the first resource features and the sample labels corresponding to the first resource features, to obtain the trained LR model.

In this embodiment, the above mentioned execution entity may train the LR model based on the first resource features and the sample labels corresponding to the first resource features, to obtain the trained LR model. During the training, the execution entity may take the first resource features as the input of the LR model, and take the inputted sample label corresponding to the first resource features as the desired output to obtain the trained LR model.

In this embodiment, the LR model may be obtained based on the first resource features and the sample label corresponding to the first resource feature.

In some alternative implementations of the present embodiment, the parameters associated with the LR model comprise at least one of: variable coefficient (coef), P value, information value (IV), population stability index (PSI), variance inflation factor (VIF), wherein the P value is a parameter to determine a test result of the pre-trained LR model.

In this embodiment, the above-mentioned executive entity may determine the second screening factor according to the parameters associated with the LR model, and the parameters associated with the LR model comprise at least one of: variable coefficient (coef), P value, information value (IV), population stability index (PSI), variance inflation factor (VIF), wherein the P value is a parameter to determine a test result of the pre-trained LR model. The above-mentioned PSI may be used to measure the difference in the distribution of the scores of the test samples and the model development samples. The above-mentioned VIF may be used to measure the severity of duplicate (multiple) collinearity in a multiple linear LR model. The IV may be used to measure the predictive ability of the independent variable; the selection range of the IV may be based on experiences, or it may be set by the user as needed.

In a specific embodiment, the second screening factor is determined according to the same number of coef>0, P value<0.05, IV>0.5, PSI<0.05, and VIF<5.

In this embodiment, the second screening factor may be determined according to the parameters associated with the LR model.

In some alternative implementations of the present embodiment, the method for generating the model also comprises a step of adjusting hyperparameters of the target model according to one of: grid search, random search, and bayesian optimization.

The above hyperparameters may be parameters that are set before the target model is trained based on the machine learning model. The hyperparameters are not parameters obtained during the process of training the target model based on the machine learning model.

In this implementation, the hyperparameters are optimized through grid search, random search or bayesian optimization, and a set of optimal hyperparameters are selected to improve the iterative efficiency of the target model.

In some alternative implementations of the present embodiment, the sample resource features comprise one of: sample image features, sample text features and sample speech features.

In this embodiment, the sample resource features may comprise any one of sample image features, sample text features, or sample voice features. The above-mentioned sample image features may be sample resource features presented in form of an image. The above-mentioned sample text feature may be sample resource features presented in form of text. The above-mentioned sample voice feature may be sample resource features presented in form of voice.

In this embodiment, the corresponding sample resource features may be obtained from the perspective of image, text, voice, etc., so that the target model may accurately predict sample image features, sample text features, and sample voice features.

With reference to FIG. 3, it shows a flow 300 of another embodiment of the method for generating a model according to the present disclosure. The method of generating the model comprises the following steps:

Step 301: acquiring sample resource features and sample labels corresponding to the sample resource features.

In this embodiment, the specific operation of step 301 has been described in detail in step 201 in the embodiment shown in FIG. 2, and will not be repeated here.

Step 302: training an XGBoost model of a decision tree based on the sample resource features and the sample labels corresponding to the sample resource features, to obtain the trained XGBoost model.

In this implementation, the execution entity of the method of generating the model (for example, server 105 in FIG. 1) may use the sample resource features and the sample labels corresponding to the sample resource features to train the XGBoost model, after obtaining the sample resource features and the sample labels corresponding to the sample resource features, to obtain the trained XGBoost model. During the training, the execution entity may take the sample resource features as the input of the XGBoost model, and take the sample labels corresponding to the inputted sample resource features as the expected output to obtain the trained XGBoost model.

Step 303: determining the first screening factor according to parameters associated with the trained XGBoost model, and determining the first resource features from the sample resource features according to the first screening factor.

In this embodiment, the specific operation of step 303 has been described in detail in step 202 in the embodiment shown in FIG. 2, and will not be repeated here.

Step 304: training the LR model based on the first resource features and the sample labels corresponding to the first resource features, to obtain the trained LR model.

In this embodiment, after obtaining the first resource features and the sample label corresponding to the first resource feature, the above-mentioned executive entity may use the first resource features and the sample label corresponding to the first resource features to train the LR model to obtain the trained LR model. During the training, the execution subject may take the first resource features as the input of the LR model, and take the sample label corresponding to the inputted first resource features as the desired output to obtain the trained LR model.

Step 305: determining the second screening factor according to the parameters associated with LR model, and determining second resource features from the first resource features based on the second screening factor, and obtaining features of a target model based on the second resource features.

In this embodiment, the specific operation of step 305 has been described in detail in step 203 in the embodiment shown in FIG. 2, and will not be repeated here.

Step 306: taking the features of the target model as the input of the target model and the sample labels corresponding to the features of the target model as the output of the target model, to train the machine learning model and obtain the trained target model.

In this embodiment, the specific operation of step 306 has been described in detail in step 204 in the embodiment shown in FIG. 2, and will not be repeated here.

As shown in FIG. 3, compared with the embodiment corresponding to FIG. 2, the process 300 of the method for generating the model in this embodiment highlights the steps of determining the first screening factor and the second screening factor. Therefore, the solution described in this embodiment improves the accuracy of the features of the target model, thereby improving the accuracy of the target model.

In some alternative implementations of the present embodiment, the parameters associated with the trained XGBoost model comprise: a coverage and a correlation coefficient; and the step of determining a first screening factor according to the sample resource features and the sample labels comprises: determining the first screening factor according to the coverage and/or the correlation coefficient.

In this embodiment, the above mentioned execution entity may determine the first screening factor according to the coverage or the correlation coefficient, or determine the first screening factor according to the coverage, or determine the first screening factor according to the correlation coefficient. The above coverage=("number of samples"−"number of samples with missed features")/"number of samples", the "number of samples" may be the number of all samples involved in the process of training the XGBoost model, and the "number of samples with missed features" may be the number of missed features in all samples. The above correlation may be the correlation coefficient between the sample resource features and the corresponding sample label.

It should be noted that where the first screening factor is determined according to the coverage and the correlation coefficient, the user may also set the weight of corresponding to the coverage and the correlation coefficient according to the feature screening requirements, and then perform a weighted sum to obtain the first screening factor.

In this embodiment, through coverage and/or correlation coefficient (cor), the determination of the first screening factor is achieved.

In some alternative implementations of the present embodiment, the parameters associated with the LR model comprise at least one of: variable coefficient, P value, information value, population stability index, variance inflation factor, wherein the P value is a parameter to determine a test result of the pre-trained LR model.

In this embodiment, the above-mentioned executive entity may determine the second screening factor according to the parameters associated with the LR model, and the parameters associated with the LR model comprise at least one of: variable coefficient (coef), P value, information value (IV), population stability index (PSI), variance inflation factor (VIF), wherein the P value is a parameter to determine a test result of the pre-trained LR model. The above-mentioned PSI may be used to measure the difference in the distribution of the scores of the test samples and the model development samples. The above-mentioned VIF may be used to measure the severity of multiple (multiple) collinearity in a multiple linear LR model. The IV may be used to measure the predictive ability of the independent variable; the selection range of the IV may be based on experience, or it may be set by the user as needed.

In a specific embodiment, the second screening factor is determined according to the same number of coef>0, P value<0.05, IV>0.5, PSI<0.05, and VIF<5. The value range of the coef same number, P value, IV, PSI and VIF may be set by the recognition accuracy of the target model to be trained.

In this embodiment, the parameters associated with the LR model may be used to determine the second screening factor.

With reference to FIG. 4, it shows a method 400 for generating a model according to another embodiment. The method 400 for generating the model comprises the following steps:

Step 401: acquiring sample resource features and sample labels corresponding to the sample resource features.

Step 402: training a XGBoost model of a decision tree based on the sample resource features and the sample labels corresponding to the sample resource features, to obtain the trained XGBoost model.

Step 403: determining the first screening factor according to parameters associated with the trained XGBoost model, and determining the first resource features from the sample resources features according to the first screening factor.

Step 404: training the LR model according to the first resource features and the sample labels corresponding to the first resource features, to obtain the trained LR model.

Step 405: determining the second screening factor based on the parameters associated with the LR model, and determining the second resource features from the first resource features according to the second screening factor.

In this embodiment, the specific operation of steps 401-405 has been described in detail in steps 301-305 in the embodiment shown in FIG. 3, and will not be repeated here.

Step 406: binning the second resource features to get the binned resource features, and determining weight of evidence corresponding to the binned resource features.

In this embodiment, the execution entity of the method of generating the model (for example, the server 105 shown in FIG. 1) may bin the second resource features to obtain the binned resource feature; then, calculate the evidence weight corresponding to each binned resource feature. The above binning may comprise one of: equal frequency binning, equal-distance binning, chi-square binning.

The above weight of evidence (WOE) may be a method to measure the difference between the distribution of normal samples (Good) and wrong samples (abnormal samples) (Bad). The WOE may be determined by the following formula:

WOE=ln(Distr Good/Distr Bad)

where, Distr Good is a normal sample, and Distr Bad is a wrong sample.

It should be noted that in the process of generating the model, the continuous variable (that is, the second resource feature) needs to be discretized; then, the discretized feature is used to train the model to obtain the trained model. The performance of the trained model will be more stable and reduces the risk of overfitting the trained model.

Step 407: taking the binned resource features as the features of the target model, in response to a changing rule of the weight of evidence corresponding to all the binned resource features conforming to a preset rule.

In this embodiment, the execution entity may take the binned resource features as the features of the target model when the changing rule of the weight of evidence corresponding to all the binned resource features conforms to the preset rule. The above-mentioned rule of change may be that the weight of evidence corresponding to all binning features increases, decreases, increases first and then decreases, first decreases and then increases, first increases and then decreases and then increases, first decreases and then increases and then decreases, etc.

Step 408: training a machine learning model, by taking the features of the target model as an input of the target model, and taking the sample labels corresponding to the features of the target model as an output of the target model to obtain the trained target model.

In this embodiment, the specific operation of step 408 has been described in detail in step 306 in the embodiment shown in FIG. 3, and will not be repeated here.

As shown in FIG. 4, compared with the embodiment corresponding to FIG. 3, the method 400 for generating a model in this embodiment highlights the step of binning the second resource feature. Therefore, the solution described in this embodiment improves the monotonicity of the second resource feature, thereby making the performance of the target model more stable, and reducing the risk of overfitting of the target model.

In some alternative implementations of the present embodiment, the method for generating a model further comprises: merging the binned resource features and calculating the weight of evidence of the merged resource features, in response to the changing rule of the weight of evidence corresponding to all the binned resource features not conforming to the preset rule; wherein the taking the binned resource features as the features of the target model, in response to the changing rule of the weight of evidence corresponding to all the binned resource features conforming to the preset rule, comprises: taking the merged resource features as the features of the target model in response to the changing rule of the weight of evidence of the merged resource features conforming to the preset rule.

In this implementation, the binned resource features are merged where the changing rule of the weight of evidence corresponding to all the binned resource features does not conform to the preset rule; then, it is judged whether the weight of evidence, which corresponds to the merged resource features, meets the preset rule. If not, it needs to merge the binned resource features again, and then further judge whether the weight of evidence corresponding to the merged resource features meets the preset rule, until the merged resource features are determined as features of the target model; otherwise, it further merges the binned resource features.

In a specific implementation, the step of binning the second resource features may comprise the following steps: (1) performing an equal frequency binning, for example, the feature is binned into 5-8 bins. (2) calculating the WOE of each bin. (3) where the WOE value conforms to the preset law, such as the value increases, the feature encoding ends, and the resource features of each box is taken as the feature of the target model. (4) where the WOE value does not conform to the preset rule, the bines are merged, such as: the age range 15-24 and 24-30 are merged into 15-30, and then execute the steps (2) and (3).

In this implementation, the feature of the target model may be obtained by binning the second resource features and calculating the evidence weight corresponding to the binned resource feature, which may improve the monotonicity of the feature of the target model.

In some alternative implementations of the present embodiment, the preset rule comprises one of the following items: the weight of evidence increases, the weight of evidence decreases, the weight of evidence first increases and then decreases, and the weight of evidence first decreases and then increases.

In this implementation, the preset rules comprise any of the following items: increasing evidence weight, decreasing evidence weight, increasing evidence weight and then decreasing evidence weight, decreasing evidence weight and then increasing evidence weight. The increasing weight of evidence mentioned above may mean that the weight of evidence corresponding to all resource features after being binned increases successively.

In this implementation, the features of the target model may be selected according to the preset rules above, and thus the singleness of the features of the target model is improved.

For ease of understanding, the following provides application scenarios that may implement the method for generating a model according to the embodiments of the present disclosure. As shown in FIG. 5, the server 502 obtains the sample resource features and the sample label corresponding to the sample resource features from the terminal device 501 (step 503); then, the server 502 determines the first screening factor according to the sample resource features and the sample label, and determines the first resource features from the sample resource features (step 504) according to the first screening factor; after that, the server 502 determines the second screening factor according to the parameters associated with the pre-trained LR model, and determines the second resource features from the first resource features based on the second screening factor, and to obtain the features of the target model based on the second resource features (step 505); finally, the server 502 takes features of the target model as the input of the target model and takes the sample labels corresponding to the features of the target model as the output of the target model, to train the machine learning model and obtain the target model (step 506).

With further reference to FIG. 6, as an implementation of the method shown in the above figures, this disclosure provides an embodiment of an apparatus for generating the model. The apparatus embodiment corresponds to the method embodiment shown in FIG. 2 and may be used in various electronic devices.

As shown in FIG. 6, an apparatus 600 for generating a model in this embodiment may comprise: a sample acquisition module 601, a first determination module 602, a second determination module 603, and a model training module 604. The sample acquisition module 601 is configured to acquire sample resource features and sample labels corresponding to the sample resource features; the first determination module 602 is configured to determine the first screening factor according to the sample resource features and the sample labels, and determine the first resource features from the sample resource features according to the first screening factor; the second determination module 603 is configured to determine the second screening factor according to the parameters associated with the pre-trained LR model, and to determine the second resource features from the first resource features based on the second screening factor, and to obtain the features of the target model based on the second resource feature; the model training module 604 is configured to train a machine learning model, by taking the features of the target model as the input of the target model and take the sample labels corresponding to the features of the target model as the output of the target model, to obtain the target model.

In this embodiment, the specific processing of the sample acquisition module 601, the first determination module 602, the second determination module 603 and the model training module 604 in the apparatus 600, and the technical effects brought by them may be referred to the detailed description of steps 201-204, which has been provided in reference to FIG. 2, and thus will not be repeated here.

In some alternative implementations of the present embodiment, the first determination module 602 comprises: a model acquisition unit (not shown) configured to train the XGBoost model of the decision tree based on the sample resource features and the sample labels corresponding to the sample resource features, to obtain the XGBoost model; a factor determination unit (not shown) configured to determine the first screen factor based on the parameters associated with the XGBoost model.

In some alternative implementations of the present embodiment, the parameters associated with the trained XGBoost model comprise: a coverage and a correlation coefficient; and wherein the factor determination unit is further configured to determine the first screening factor according to the coverage and/or the correlation coefficient.

In some alternative implementations of the present embodiment, the apparatus for generating a model further comprises: a feature sorting module (not shown), configured to sort the sample resource features to get the sorted sample resource features; the first determination module 602 is further configured to determine the first resource features from a preset number of sample resource features in the sorted sample resource features according to the first screening factor.

In some alternative implementations of the present embodiment, the feature sorting module is further configured to sort, according to the feature importance of the sample resource features, the sample resource features to obtain the sorted sample resource features.

In some alternative implementations of the present embodiment, prior to determination of a second screening factor based on the parameters associated with the pre-trained LR model, the apparatus for generating a model further comprises: a model acquisition module (not shown) configured to train LR model based on the first resource features and the sample labels corresponding to the first resource features to obtain trained the LR model.

In some alternative implementations of the present embodiment, the parameters associated with the LR model comprise at least one of the following: variable coefficient, P value, information value, population stability index, variance inflation coefficient, wherein the P value is a parameter to determine the test result of the pre-trained LR model.

In some alternative implementations of the present embodiment, the apparatus for generating a model further comprises: a first processing module (not shown) configured to bin the second resource features to get the binned resource features and determine the weight of evidence corresponding to the binned resource features; a determining model module (not shown) configured to take the binned resource features as the features of the target model, in response to a changing rule of the weight of evidence corresponding to all the binned resource features conforming to the preset rule.

In some alternative implementations of the present embodiment, the apparatus for generating a model further comprises: a second processing module (not shown) configured to merge the binned resource features and calculate a weight of evidence of the merged resource features, in response to changing rule of the weight of evidence corresponding to all the binned resource features not conforming to the preset rule. The first determining model module is further configured to: take the merged resource features as the features of the target model in response to the changing rule of the weight of evidence of the merged resource features conforming to the preset rule.

In some alternative implementations of the present embodiment, the preset rule comprises one of: the weight of evidence increasing, the weight of evidence decreasing, the weight of evidence increasing first and then decreasing, the weight of evidence decreasing first and then increasing.

In some alternative implementations of the present embodiment, the apparatus for generating a model further comprises: a parameter adjustment module configured to adjust the hyperparameters of the target model according to one of: grid search, random search, bayesian optimization.

In some alternative implementations of the present embodiment, the sample resource features comprise one of: sample image features, sample text features and sample speech features.

According to an embodiment of the present disclosure, the present disclosure further provides an electronic device, a readable storage medium and a computer program product.

As shown in FIG. 7, which is a block diagram of an electronic device 700 according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the electronic device 700 comprises a computing unit 701, which may perform various appropriate actions and processes based on a computer program stored in a read-only memory (ROM) 702 or loaded from memory device 708 random access memory (RAM) 703. And in the RAM 703, it also stores programs and data required for 700 operations of electronic devices. The calculation unit 701, the ROM 702, and the RAM 703 are connected to each other by bus 704. An input/output (I/O) interface 705 is also connected to the bus 704.

Multiple components in the device 700 are connected to the I/O interface 705, comprising: an input unit 706, such as a keyboard, a mouse, etc.; an output unit 707, such as various types of displays, speakers, etc.; a storage unit 708, such as a magnetic disk, an optical disk, etc.; a communication unit 709, such as a network card, a modem, a wireless communication transceiver, etc. The communication unit 709 allows the device 700 to exchange information/data with other devices through a computer network such as the Internet and/or various telecommunication networks The computing unit 701 may be various general-purpose and/or particular-purpose processing components with processing and computing capabilities. Some examples of the computing unit 701 comprise, but are not limited to, central processing unit (CPU), graphics processing unit (GPU), various dedicated artificial intelligence (AI) computing chips, various computing units that run machine learning model algorithms, digital signal processing DSP, and any appropriate processor, controller, microcontroller, etc. The calculation unit 701 executes the various methods and processes described above, such as a method of generating a model. For example, in some embodiments, the method of generating a model may be implemented as a computer software program, which is tangibly contained in a machine-readable medium, such as the storage unit 708.

In some embodiments, part or all of the computer program may be loaded and/or installed on the device 700 via the ROM 702 and/or the communication unit 709. Where the computer program is loaded into the RAM 703 and executed by the calculation unit 701, one or more steps of the method for generating a model described above may be executed. Alternatively, in other embodiments, the computing unit 701 may be configured to execute the method of generating the model in any other suitable manner (for example, by means of firmware).

Various implementations of the systems and technologies described above may be implemented in digital electronic circuit systems, integrated circuit systems, field programmable gate arrays (FPGA), application specific integrated circuits (ASIC), application-specific standard products (ASSP), system-on-chip SOC, load programmable logic device (CPLD), computer hardware, firmware, software, and/or their combination. These various embodiments may comprise: being implemented in one or more computer programs, the one or more computer programs may be executed and/or interpreted on a programmable system comprising at least one programmable processor, the programmable processor may be a dedicated or general-purpose programmable processor that may receive data and instructions from the storage system, at least one input device, and at least one output device, and transmit the data and instructions to the storage system, the at least one input device, and the at least one output device. An output device The program code used to implement the method of some embodiments of the present disclosure may be written in any combination of one or more programming languages. These program codes may be provided to the processors or controllers of general-purpose computers, particular-purpose computers, or other programmable data processing devices, so that the program codes when executed by the processors or controllers, enable the functions/operation specified in the flowcharts and/or block diagrams implemented. The program code may be executed entirely on the machine, or partly on the machine, or as an independent software package, partly executed on the machine and partly executed on the remote machine, or entirely executed on the remote machine or server.

In the context of some embodiments of the present disclosure, a machine-readable medium may be a tangible medium, which may contain or store a program for use by or in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of the foregoing. More specific examples of machine-readable storage media would comprise electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (comprising acoustic input, voice input, or tactile input) may be used to receive input from the user.

The systems and technologies described herein may be implemented in a computing system that comprises backend components (e.g., as a data server), or a computing system that comprises middleware components (e.g., application server), or a computing system that comprises frontend components (for example, a user computer having a graphical user interface or a web browser, through which the user may interact with the implementations of the systems and the technologies described herein), or a computing system that comprises any combination of such backend components, middleware components, or frontend components. The components of the system may be interconnected by any form or medium of digital data communication (e.g., communication network). Examples of the communication network comprise: local area networks (LAN), wide area networks (WAN), and the Internet.

The computer system may comprise a client and a server. The client and the server are generally far from each other and usually interact through the communication network. The relationship between the client and the server is generated by computer programs that run on the corresponding computer and have a client-server relationship with each other.

Artificial intelligence is a discipline that studies computers to simulate certain thinking processes and intelligent behaviors of human beings (such as learning, reasoning, thinking, planning, etc.). It has both hardware and software technologies. Artificial intelligence hardware technology generally comprises such technologies as sensors, particular artificial intelligence chips, cloud computing, distributed storage, big data processing, etc. Artificial intelligence software technology mainly comprises computer vision technology, speech recognition technology, natural speech processing technology, machine learning/deep learning, big data processing technology, knowledge graph technology and other directions.

The method for generating the model provided in the embodiment of the present disclosure comprises: firstly, acquiring sample resource features and sample labels corresponding to the sample resource features; secondly, determining a first screening factor according to the sample resource features and the sample labels, and determining first resource features from the sample resource features according to the first screening factor; then determining a second screening factor according to parameters associated with a pre-trained LR model, and determining second resource features from the first resource features based on the second screening factor, and obtaining features of a target model based on the second resource features; and finally training a machine learning model, by taking the features of the target model as an input of the target model, and taking the sample labels corresponding to the features of the target model as an output of the target model, to obtain the trained target model. This avoids the need to rely on a large number of feature engineering, feature screening and model interpretability when determining features to be inputted into the target model based on the LR model, thereby reducing time and manpower consumption.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure may be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be comprised in the protection scope of the present disclosure.

What is claimed is:

1. A method of generating a model, comprising:

acquiring sample resource features and sample labels corresponding to the sample resource features, wherein the sample resource features comprise one of sample image features, sample text features, or sample voice features;

training an extreme Gradient Boosting, XGBoost, model of a decision tree by taking the sample resource features as an input of the XGBoost model, and taking the sample labels corresponding to the sample resource features as a desired output, to obtain the trained XGBoost model;

determining a first screening factor based on parameters associated with the trained XGBoost model, the parameters associated with the trained XGBoost model comprising coverage and a correlation coefficient, the determining comprising: setting a weight of the coverage and a weight of the correlation coefficient according to feature screening requirements, and performing a weighted sum of the coverage and the correlation coefficient to obtain the first screening factor, wherein the correlation coefficient is a correlation coefficient between the sample resource features and the sample labels corresponding to the sample resource features, and the coverage is a ratio of a difference between a total number of samples and a number of samples with missed features to the total number of samples, wherein the total number of samples is a number of all samples involved in a process of training the XGBoost model, and the number of samples with missed features is a number of samples, which have missed features in all samples;

determining first resource features from the sample resource features according to the first screening factor;

training a logistic regression, LR, model, by taking the first resource features as an input of the LR model, and taking sample labels corresponding to the first resource features as a desired output to obtain a trained LR model;

determining a second screening factor according to parameters associated with the trained LR model, and determining second resource features from the first resource features based on the second screening factor, and obtaining features of a target model based on the second resource features;

training a machine learning model, by taking the features of the target model as an input of the target model, and taking the sample labels corresponding to the features of the target model as a target value of the target model, to obtain the trained target model; and predicting the sample image features, sample text features, or sample voice features using the trained target model to obtain a binary classification result.

2. The method of claim 1, wherein the method further comprises:

sorting the sample resource features to get the sorted sample resource features; and determining the first resource features comprises:

determining the first resource features from a preset number of sample resource features in the sorted sample resource features according to the first screening factor.

3. The method of claim 1, wherein the method further comprises:

sorting the sample resource features to get the sorted sample resource features; and determining the first resource features comprises:

determining the first resource features from a preset number of sample resource features in the sorted sample resource features according to the first screening factor.

4. The method of claim 1, wherein the method further comprises:

sorting the sample resource features to get the sorted sample resource features; and determining the first resource features comprises:

determining the first resource features from a preset number of sample resource features in the sorted sample resource features according to the first screening factor.

5. The method of claim 2, wherein sorting the sample resource features to get the sorted sample resource features comprises:

sorting, according to the feature importance of the sample resource features, the sample resource features to obtain the sorted sample resource features.

6. The method of claim 1, wherein the parameters associated with the LR model comprise at least one of:

variable coefficients, P value, information value, population stability index, or variance inflation factor, wherein the P value is a parameter to determine a test result of the pre-trained LR model.

7. The method of claim 1, wherein the method further comprises:

binning the second resource features to get the binned resource features, and determining weight of evidence corresponding to the binned resource features; and taking the binned resource features as the features of the target model, in response to a changing rule of the weight of evidence corresponding to all the binned resource features conforming to a preset rule.

8. The method of claim 7, wherein the method further comprises:

merging the binned resource features and calculating the weight of evidence of the merged resource features, in response to the changing rule of the weight of evidence corresponding to all the binned resource features not conforming to the preset rule;

wherein taking the binned resource features as the features of the target model comprises:

taking the merged resource features as the features of the target model in response to the changing rule of the weight of evidence of the merged resource features conforming to the preset rule.

9. The method of claim 7, wherein the preset rule comprises one of:

the weight of evidence increasing, the weight of evidence decreasing, the weight of evidence increasing first and then decreasing, or the weight of evidence decreasing first and then increasing.

10. The method of claim 8, wherein the preset rule comprises one of:

the weight of evidence increasing, the weight of evidence decreasing, the weight of evidence increasing first and then decreasing, or the weight of evidence decreasing first and then increasing.

11. The method of claim 1, further comprising:

adjusting hyperparameters of the target model according to one of grid search, random search, or bayesian optimization.

12. An electronic device, comprising:

at least one processor; and a memory storing instructions that, when executed by the at least one processor, cause the at least one processor to perform operations for generating a model, the operations comprising:

acquiring sample resource features and sample labels corresponding to the sample resource features, wherein the sample resource features comprise one of sample image features, sample text features, or sample voice features;

training an eXtreme Gradient Boosting, XGBoost, model of a decision tree by taking the sample resource features as an input of the XGBoost model, and taking the sample labels corresponding to the sample resource features as a desired output, to obtain the trained XGBoost model;

determining a first screening factor based on parameters associated with the trained XGBoost model, the parameters associated with the trained XGBoost model comprising coverage and a correlation coefficient, the determining comprising setting a weight of a coverage and a weight of a correlation coefficient according to feature screening requirements, and performing a weighted sum of the coverage and the correlation coefficient to obtain the first screening factor, wherein the correlation coefficient is a correlation coefficient between the sample resource features and the sample labels corresponding to the sample resource features, and the coverage is a ratio of a difference between a total number of samples and a number of samples with missed features to the total number of samples, wherein the total number of samples is a number of all samples involved in a process of training the XGBoost model, and the number of samples with missed features is a number of samples, which have missed features in all samples;

determining first resource features from the sample resource features according to the first screening factor;

training a logistic regression, LR, model, by taking the first resource features as an input of the LR model, and taking sample labels corresponding to the first resource features as a desired output to obtain a trained LR model;

determining a second screening factor according to parameters associated with the trained LR model, and determining second resource features from the first resource features based on the second screening factor, and obtaining features of a target model based on the second resource features;

training a machine learning model, by taking the features of the target model as an input of the target model, and taking the sample labels corresponding to the features of the target model as a target value of the target model, to obtain the trained target model; and predicting the sample image features, sample text features, or sample voice features using the trained target model to obtain a binary classification result.

13. The device of claim 12, wherein the operations further comprise:

sorting the sample resource features to get the sorted sample resource features; and determining the first resource features comprises:

determining the first resource features from a preset number of sample resource features in the sorted sample resource features according to the first screening factor.

14. A non-transitory computer-readable storage medium storing computer instructions that, when executed by a computer, cause the computer to perform operations for generating a model, the operations comprising:

acquiring sample resource features and sample labels corresponding to the sample resource features, wherein the sample resource features comprise one of sample image features, sample text features, or sample voice features;

training an eXtreme Gradient Boosting, XGBoost, model of a decision tree by taking the sample resource features as an input of the XGBoost model, and taking the sample labels corresponding to the sample resource features as a desired output, to obtain the trained XGBoost model;

determining a first screening factor based on meters associated the trained XGBoost model, the parameter associated with the trained XGBoost model comprising coverage and a correlation coefficient, the determining comprising: setting a weight of a coverage and a weight of a correlation coefficient according to feature screening requirements, and performing a weighted sum of the coverage and the correlation coefficient to obtain the first screening factor, wherein the correlation coefficient is a correlation coefficient between the sample resource features and the sample labels corresponding to the sample resource features, and the coverage is a ratio of a difference between a total number of samples and a number of samples with missed features to the total number of samples, wherein the total number of samples is a number of all samples involved in a process of training the XGBoost model, and the number of samples with missed features is a number of samples, which have missed features in all samples;

determining first resource features from the sample resource features according to the first screening factor;

training a logistic regression, LR, model, by taking the first resource features as an input of the LR model, and taking sample labels corresponding to the first resource features as a desired output to obtain a trained LR model;

determining a second screening factor according to parameters associated with the trained LR model, and determining second resource features from the first resource features based on the second screening factor, and obtaining features of a target model based on the second resource features;

training a machine learning model, by taking the features of the target model as an input of the target model, and taking the sample labels corresponding to the features of the target model as a target value of the target model, to obtain the trained target model; and predicting the sample image features, sample text features, or sample voice features using the trained target model to obtain a binary classification result.

* * * * *